A. H. SANBORN AND J. C. STANGIER.
B. STANGIER BEING ADMINISTRATRIX OF J. C. STANGIER, DEC'D.
APPARATUS FOR SEALING.
APPLICATION FILED AUG. 17, 1918.
1,413,996. Patented Apr. 25, 1922.
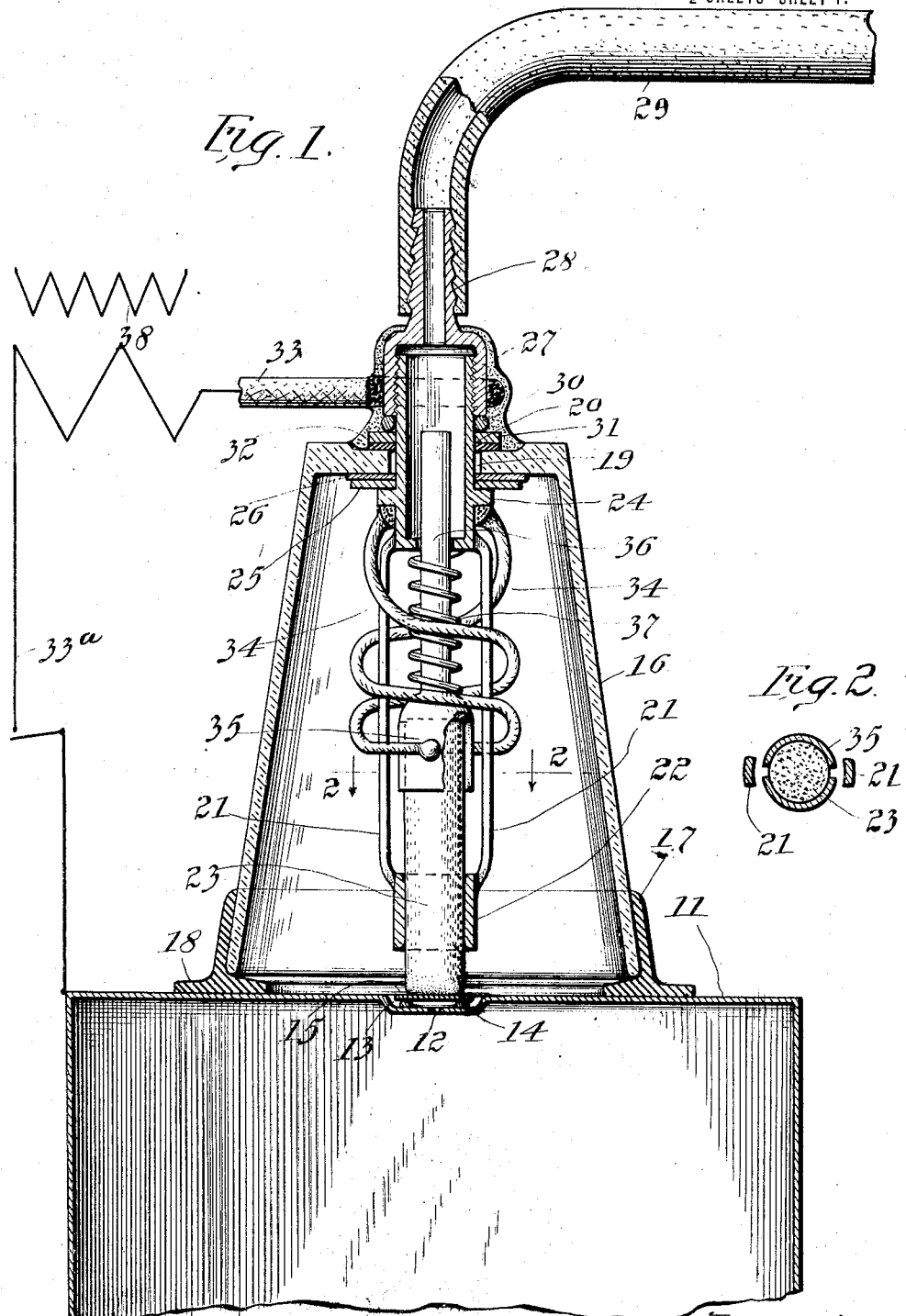

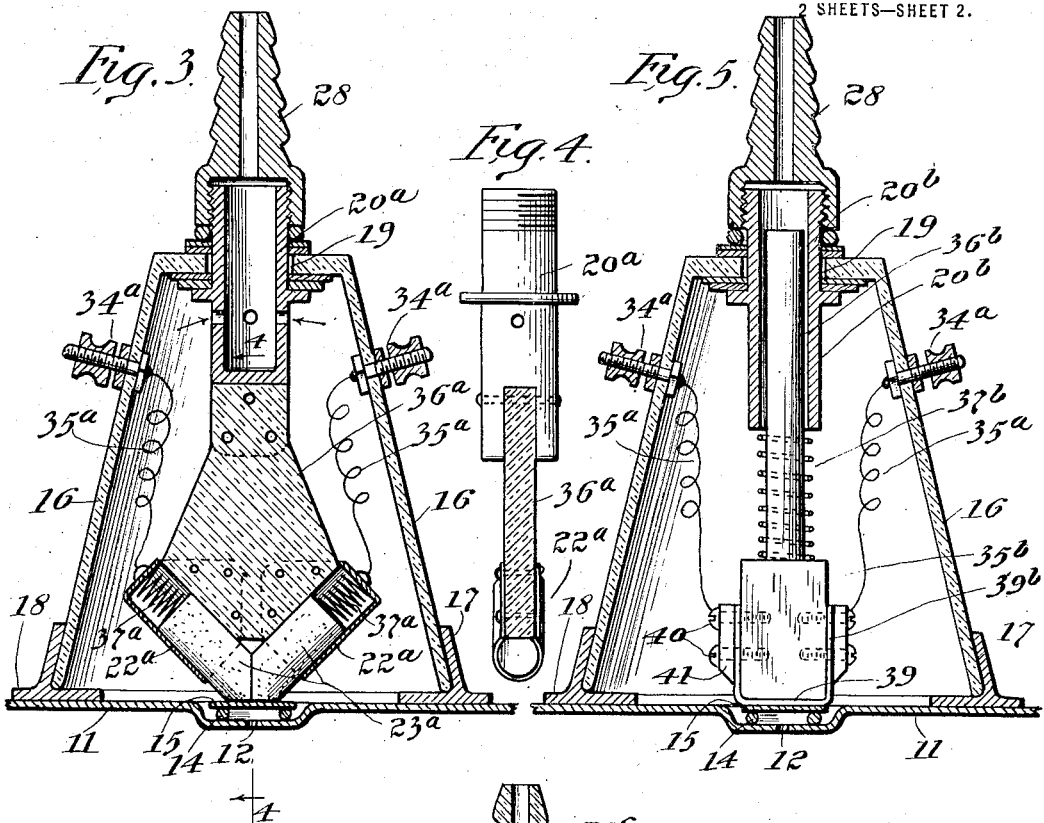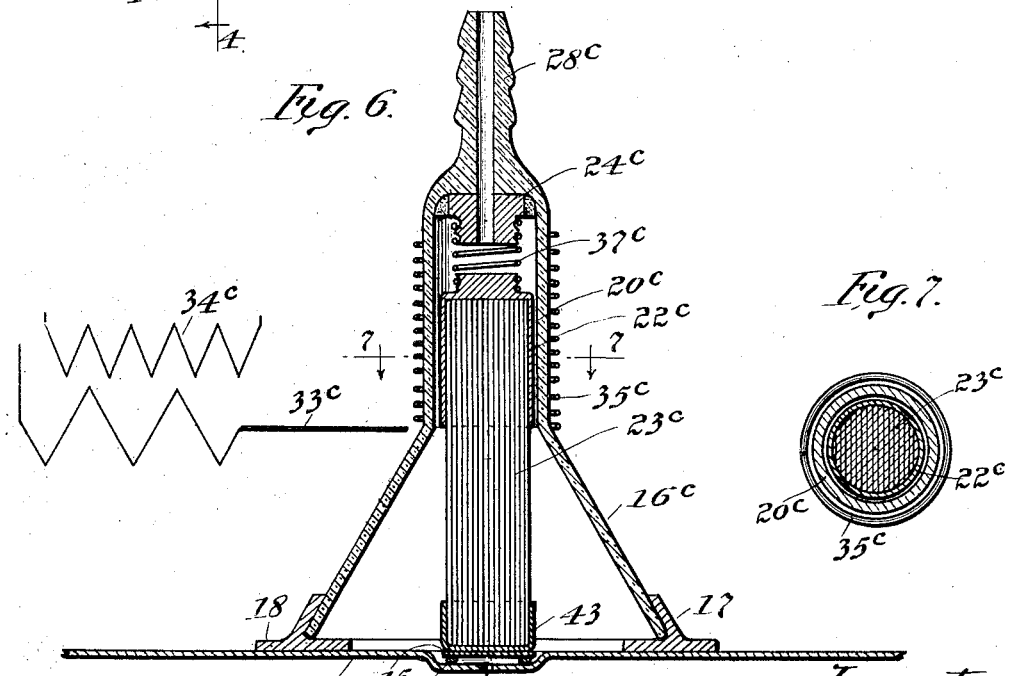

UNITED STATES PATENT OFFICE.

ARTHUR H. SANBORN AND JOSEPH C. STANGIER, OF CHICAGO, ILLINOIS, ASSIGNORS OF ONE-THIRD TO JOHN C. McFARLAND, OF CHICAGO, ILLINOIS; BERTHA STANGIER BEING ADMINISTRATRIX OF SAID JOSEPH C. STANGIER, DECEASED.

APPARATUS FOR SEALING.

1,413,996.  Specification of Letters Patent.  Patented Apr. 25, 1922.

Application filed August 17, 1918. Serial No. 250,390.

*To all whom it may concern:*

Be it known that ARTHUR H. SANBORN and JOSEPH C. STANGIER, citizens of the United States, and residents of the city of Chicago, in the county of Cook and State of Illinois, have invented certain new and useful Improvements in Apparatus for Sealing, of which the following is a full, clear, and exact specification.

Our invention is concerned with a simple and novel apparatus for sealing in vacuo, which is designed mainly for sealing up the aperture in a vessel which has been evacuated.

To this end, we have devised a simple device which preferably takes a considerable current of low voltage so that by simply putting the apparatus in place and closing the circuit (after the air has been exhausted) the sealing is quickly and thoroughly effected without in the slightest reducing the degree of the vacuum.

To illustrate our invention, we append two sheets of drawings showing several forms of the sealing device in which the same reference characters are used to designate identical parts in all the figures, of which—

Fig. 1 is a central vertical section through our novel apparatus shown in place and ready for use;

Fig. 2 is a detail in cross-section on the line 2—2 of Fig. 1;

Fig. 3 is a view similar to Fig. 1 but showing a modification;

Fig. 4 is a view in vertical section on the line 4—4 of Fig. 3;

Fig. 5 is a view similar to Fig. 1 but showing still another modification;

Fig. 6 is a view similar to Fig. 1 but showing another modification; and

Fig. 7 is a section on the line 7—7 of Fig. 6.

The part 11 represents the casing or vessel which is to be evacuated and sealed, and the air in the vessel must be exhausted through the aperture 12 in the casing 11, which aperture 12 is preferably located in the depression 13 formed in the casing 11. Before the apparatus to be described is applied solder or other sealing material is placed in the depression 13 about or over the aperture 12, and a disk 15 of the same metal as the casing 11 or any other appropriate material may be placed in the depression and preferably on top of the sealing material.

In the preferred form of our sealing device as shown in Fig. 1 the body of the apparatus is formed by a preferably transparent bell 16, which is conveniently constructed of glass, and may be of the general shape of a drinking glass, and is provided around its open end with a ring 17 of soft rubber or some similar elastic material, which ring preferably has the wide base flange 18 with the flat lower surface, which, when seated on the top of the casing 11 readily makes an air-tight contact therewith and it will be understood that the vertical portion of the ring 17 makes an air-tight contact with the open end of the glass or bell 16.

Passed through a suitable aperture 19 formed in the other end of the glass is a metallic tube 20, and has depending therefrom two or more bars or extensions 21, which may be conveniently formed by cutting away part of a longer tube, which extensions support the ring 22 which serves as the vertical guide for the electrode 23, which may be carbon or other suitable material. The tube 20 has the flange 24 formed thereon which engages and supports the washer 25, which in turn engages and supports the soft rubber or some similar gasket 26 pressed against the adjacent surface of the glass. The upper end of the tube 20 is threaded and has screwed thereon the internally threaded cup portion 27 of the hose nipple 28 which has secured thereon the end of the hose 29 which is connected to any suitable pump or other means for exhausting the air from the vessel to be evacuated and from the interior of the bell 16. The end 27 of the nipple is screwed down upon the ring 30, which in turn rests on the metallic washer 31 resting on the soft rubber or similar gasket 32 resting on the outer surface of that end of the bell. A metallic cable 33 is electrically connected by soldering or otherwise to the cup 27 thus making electrical connection to the tube 20, and to insure the connections being air-tight, the gasket 32, washer 31, ring 30 and cup 27 are preferably luted with some suitable wax to the glass bell 16. Preferably just beneath the flange 24 is soldered the ends of a pair of flexible wire cables 34, which have their other ends soldered to the metallic body 35 of the electrode holder which has a guiding extension 36 projecting up into the body of the tube. A helically coiled compression spring 37 surrounds the extension 36 and engages the lower end of the tube 20 so as to press the electrode 23 held in the holder 35 upon the metallic disk 15 when the parts are properly positioned. The cable 33$^a$ extends to and is electrically connected with the vessel by any convenient means, the cables 33 and 33$^a$ being in the circuit of a transformer 38, or other suitable source of current.

When the parts are assembled as shown in the drawing and after the vessel has been evacuated, and while the vacuum is still maintained the operator causes a suitable current of electricity to flow through the electrode 23, the disk 15, the solder or other sealing material 14, and the casing 11. This current passing through the contact resistance between the end of the electrode and the disk 15 generates heat, so much so that the disk 15 is promptly heated hot enough to melt the solder or other sealing material 14, and the pressure of the spring 37 forces the disk 15 down on the softening solder or other sealing material with the result that the aperture 12 is thoroughly sealed.

In Figs. 3 and 4, we have shown a modification in which the tube 20$^a$ is provided at its lower end with an insulating block support 36$^a$, which has secured on its lower end a pair of metallic guides 22$^a$ secured thereto and having mounted therein the pair of carbons 23$^a$, which have their ends beveled off so as to cause the opposed portions of said ends to be pressed together by the helically coiled springs 37$^a$ mounted in the ends of the holders 22$^a$ in the manner clearly shown. The other angular faces of the ends of the carbons 23$^a$ are beveled off to form a common plain surface which rests on the top of the metallic disk 15 as before. A pair of binding posts 34$^a$ may be sealed hermetically in suitable apertures in the sides of the bell 16 and connected by the flexible wires 35$^a$ with the metallic carbon guides 22$^a$.

With the structure described, and with the terminals 34$^a$ connected in a circuit of low voltage, but large amperage, the current passing through the contact where the carbons 23$^a$ are pressed together and between said carbons and the disk will heat said carbons and the heat will in turn be transmitted by conduction to the disk 15, melting the ring of solder 14 and sealing the aperture 12 as before.

In Fig. 5, the tube 20$^b$ is used as a guide for the stem 36$^b$ of the insulating block 35$^b$, which has secured on its lower end the resistance disk 39, which has the stems 39$^b$ secured on the block 35$^b$ by the set-screws 40 through the terminal blocks 41 connected by the flexible wires 35$^a$ to terminals 34$^a$ similar to those employed in the modification shown in Fig. 3. A helically coiled compression spring 37$^b$ surrounds the stem 36$^b$ abutting against the lower end of the tube 20$^b$ and the top of the block 36$^b$ so as to press the resistance disk 39 down on the sheet metal disk 15.

With this modification, after the air has been exhausted, the apparatus is energized from a suitable source of electricity and the current passing through the disk 39 generates sufficient heat to melt the solder 14 by conduction and cause the aperture 12 to be sealed as before.

In Fig. 6, we have shown a still further modification. Here the bell 16$^c$ and the nipple 28$^c$ are preferably made integral of some insulating material such as glass, and the bell is contracted as at 20$^c$ to form a guide for a bundle 23$^c$ of laminated plates or wires sufficiently insulated from each other so that no large eddy currents will be generated therein. The plates or wires 23$^c$ are held together by the insulating cap 22$^c$, and a helically coiled compression spring 37$^c$ is conveniently secured on an abutment on the top of the cap 22$^c$ and its other end co-operates with an abutment 24$^c$ secured on the under side of the shoulder connecting the guide portion 20$^c$ with the nipple portion 28$^c$ of bell 16$^c$. The outside of the guide portion 20$^c$ of the bell is surrounded by a helix 35$^c$ which is in a circuit 33$^c$ having associated therewith a source 34$^c$ of alternating current of suitable frequency and voltage so that when the circuit 33$^c$ is closed a strong magnetic flux will be generated in the bundle 23$^c$ of plates or wires. On the bottom of the bundle, we may secure a cap 43, which is pressed against the metallic disk 15, as before. This cap may be of insulating material, in which case the heat necessary to melt the solder 14 is generated in the metal below the cap due to the eddy currents induced in said metal, or it may be a cap of nichrome or other material with proper characteristics, in which case the heat is generated in the nichrome cap due to the eddy currents induced in it, and conducted through the disk 15 to the solder 14, as well as being generated in the metal below said cap 43.

While we have shown and described our invention as embodied in the forms which we at present consider best adapted to carry out its purposes, it will be understood that it is capable of further modifications, and that we do not desire to be limited in the interpretation of the following claims except as may be necessitated by the prior state of the art.

While we have herein disclosed the modifications shown in Figures 3, 5 and 6, covered by our generic claims, we hereby reserve the right to file divisional applications containing specific claims for said modifications.

What we claim as new and desire to secure by Letters Patent of the United States is:

1. In a device of the class described, the combination with a bell provided with an elastic annulus about its open end and a tube opening into it through the closed end through which it may be evacuated, of electrode holder mounted to slide therein along the axis of the bell, an electrode in the holder, a spring adapted to co-operate with the holder and tending to force the free end of the electrode out of the bell, and connections whereby a circuit may be established through said electrode holder, electrode, disk, sealing material and metallic surface upon which the elastic annulus is seated and against which the electrode is pressed, for the purpose described.

2. In a device of the class described, the combination with a bell provided with an elastic annulus about its open end, of a tube extending therethrough and hermetically sealed therein having a nipple on its outer end and an electrode guide on its inner end, an electrode holder mounted to slide along the axis of the bell, an electrode in the holder, a helically coiled compression spring interposed between the holder and the tube tending to force the free end of the electrode out of the bell, and connections whereby a circuit may be established through said electrode holder, electrode, disk, sealing material and metallic surface upon which the elastic annulus is seated and against which the electrode is pressed, for the purpose described.

3. In a device of the class described, the combination with a bell provided with an elastic annulus about its open end, of a tube extending therethrough and hermetically sealed therein having a nipple on its outer end and an electrode guide on its inner end, an electrode holder mounted to slide along the axis of the bell, an electrode in the holder, a helically coiled compression spring interposed between the holder and the tube tending to force the free end of the electrode out of the bell, a cable electrically secured to the outer end of the tube, and a wire connecting the inner end of the tube and the electrode holder, for the purpose described.

4. In a device of the class described, the combination with a bell provided with an elastic annulus about its open end, of a tube extending through an aperture in the other end of the bell and having a flange within the bell and its outer end externally threaded, a nipple screwed onto the outer end of the tube, suitable washers and gaskets interposed between the flange and the nipple, an electrical conductor connected to the outer end of the tube, an electrode guide in alignment with the tube and supported thereby within the bell, an electrode holder between the end of the tube and the electrode guide having an extension projecting into the tube, a helically coiled compression spring surrounding the extension between the electrode holder and the inner end of the tube, and flexible electrical connections between the inner end of the tube and the electrode holder, substantially as and for the purpose described.

5. In a device of the class described, the combination with a bell having an elastic sealing annulus on its lower open end and a tubular nipple opening into its closed end, of a holder supported entirely within the bell, an electrical element carried by said holder, a spring tending to force the electrical element toward the open end, and electrical means for supplying current to said electrical element for the purpose described.

6. In a device of the class described, the combination with a glass bell having a rubber sealing annulus on its open end and a tubular nipple opening into its closed end, of a holder supported in the bell, an electrical element carried by said holder, a spring within the bell tending to force the electrical element toward the open end, and electrical means for supplying current to said electrical element for the purpose described.

7. In a device of the kind described, a vacuum bell having an open end, provided with a yielding packing ring for effecting an air tight sealing of the bell upon the article to be sealed, a carbon conductor element within the bell, adapted to be heated by the passage of a suitable current of electricity therethrough, means for yieldingly pressing the element against the article to be sealed whereby heat is transmitted for effecting the sealing operation.

In witness whereof, we have hereunto set our hands and affixed our seals, this 13th day of August, A. D. 1918.

ARTHUR H. SANBORN. [L. S.]
JOSEPH C. STANGIER. [L. S.]

Witness:
    JNO. G. ELLIOTT.